United States Patent [19]

Schatteman

[11] 4,394,698
[45] Jul. 19, 1983

[54] APPARATUS FOR AUTOMATIC INVERTING OF CASSETTES

[75] Inventor: Etienne A. M. Schatteman, Wemmel, Belgium

[73] Assignee: Staar S. A., Belgium

[21] Appl. No.: 245,381

[22] Filed: Mar. 19, 1981

[51] Int. Cl.³ .......................... G11B 5/00; G11B 15/68
[52] U.S. Cl. ...................................... 360/96.5; 360/92
[58] Field of Search .................. 360/96.5, 92; 242/198

[56] References Cited

U.S. PATENT DOCUMENTS

| | | | |
|---|---|---|---|
| 3,603,597 | 9/1971 | Haake | 360/92 |
| 3,722,892 | 3/1973 | Haake | 360/92 |
| 3,833,224 | 9/1974 | Haake | 360/92 |
| 3,836,154 | 9/1974 | Ishikawa | 360/92 |
| 4,114,182 | 9/1978 | Zeh et al. | 360/92 |

Primary Examiner—Alfred H. Eddleman
Attorney, Agent, or Firm—Leydig, Voit, Osann, Mayer and Holt, Ltd.

[57] ABSTRACT

There is disclosed an automatic tape cassette inverting apparatus for a tape recorder/playback device. The automatic tape cassette inverting apparatus is capable of receiving a video tape cassette in a horizontal position in a magazine, holding it in the magazine, inverting the cassette by rotating the magazine and transferring the cassette between the holding position in the magazine and the operating position in the tape recorder/playback device. The magazine includes a stop mechanism for stopping and holding the video tape cassette in the holding position while the magazine is being rotated as well as a backup stop mechanism to be assured that during rotation, the tape cassette cannot accidentally be dislodged from the holding position in the magazine. There is also an arrest mechanism provided on the magazine to arrest any inertial movement of the tape as it is transferred between the tape recorder/playback device and the magazine. Finally, there is a transfer mechanism which cooperates with the stop mechanism on the magazine to transfer the cassette between the operating position in the recorder/playback device and the holding position in the magazine.

10 Claims, 12 Drawing Figures

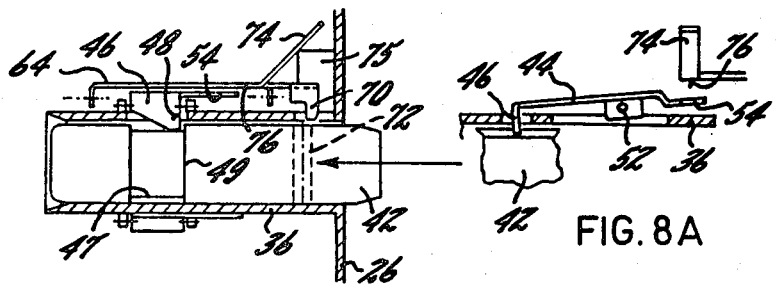
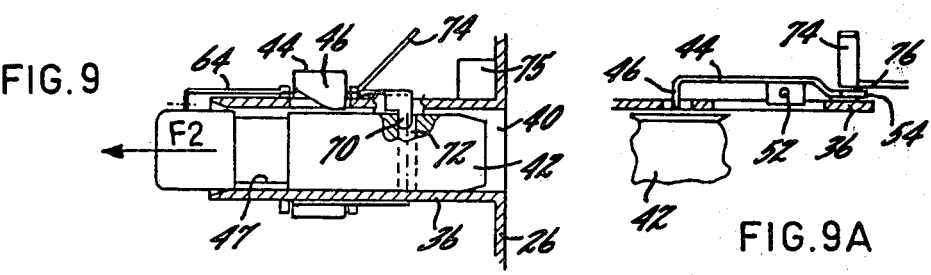
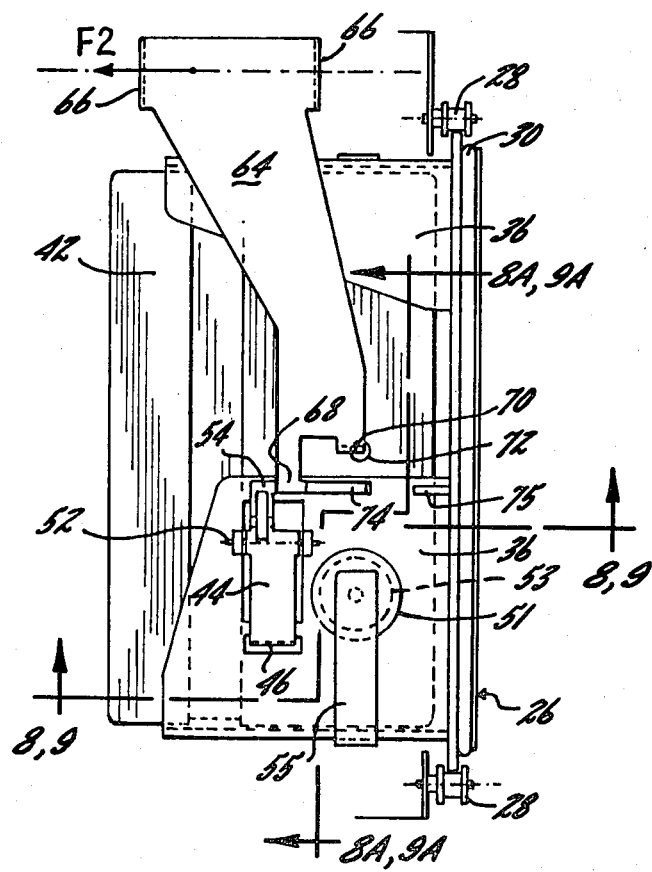

APPARATUS FOR AUTOMATIC INVERTING OF CASSETTES

The present invention relates to an automatic tape cassette inverting apparatus for tape recorder/playback devices, particularly but not exclusively, video cassette tape machines.

In video tape machines, recording and playback can be performed only by running the video tape in one direction. In order to utilize the other set of recording tracks on the tape, and thus utilize the full capacity of the tape, it is necessary to turn the cassette over (invert). Especially in the situation where recording is being accomplished in the absence of the video tape machine's user, it is desirable that the inverting of the cassette be accomplished automatically, i.e., without intervention of the user.

Devices heretofore proposed for inverting cassettes of music and sound tapes have been highly complex, unreliable and in all cases known to applicants unsuited for various reasons for use in video machines. In applicant's related copending application Ser. No. 150,365, entitled Cassette Changer Apparatus, there is disclosed an automatic video tape cassette changer consisting of a magazine for vertically feeding the video tape into the operating position in the video tape machine and for holding the video tape in a vertical position while it is being turned over. In some cases, however, it is desirable and advisable for the video tape mechanism to be disposed in a horizontal plane so that the quality of the reconstituted image is as good as possible.

Therefore, it is an object of the present invention to provide an automatic cassette inverting apparatus which is capable of receiving a video tape cassette in a horizontal position in a magazine, holding it in the magazine, inverting the cassette by rotating the magazine and transferring the cassette between the holding position in the magazine and the operating position in the tape machine.

It is a further object of the present invention to provide a stop mechanism on the magazine for stopping the movement of the video tape cassette toward the operating position in the tape machine as the cassette is received by the magazine and for holding the cassette while the magazine is being rotated to invert the tape cassette.

A related object is to provide an arresting mechanism which, when the cassette is being fed from the operating position in the tape machine to the holding position in the magazine, arrests the inertial movement of the tape so that it is positioned for transfer back into the tape machine after being inverted.

It is also a collateral object of the present invention to provide a back up stop mechanism disposed in a plane extending perpendicular to the direction of travel of the cassette between the magazine and the operating position in the tape machine so that during rotation of the magazine, the possibility of the cassette moving toward the tape machine is eliminated.

A further object of the present invention is to provide a positive catch mechanism that catches and holds the magazine at the proper rotational position.

Another important object of the present invention is to provide a transfer mechanism having a transfer arm which acts to disengage the stop mechanism while at the same time conveying the cassette between the magazine holding position and the operating position in the tape machine.

An ancillary object of the present invention is to provide the transfer mechanism with an end locking device which locks the transfer arm at either end of its travel to assure noninterference by the transfer arm with rotation of the magazine or insertion of the cassette into the magazine.

Other features and advantages of the invention will become clear from the following description of the invention with reference to the accompanying drawings, in which:

FIG. 7 is a top plan view of the automatic cassette inverting apparatus;

FIGS. 8 and 9 are sectional views taken along the plane of 8, 9—8, 9 of FIG. 7; and FIGS. 8a and 9a are sectional view taken along the plane of 8a, 9a—8a, 9a of FIG. 7.

Figure 1:
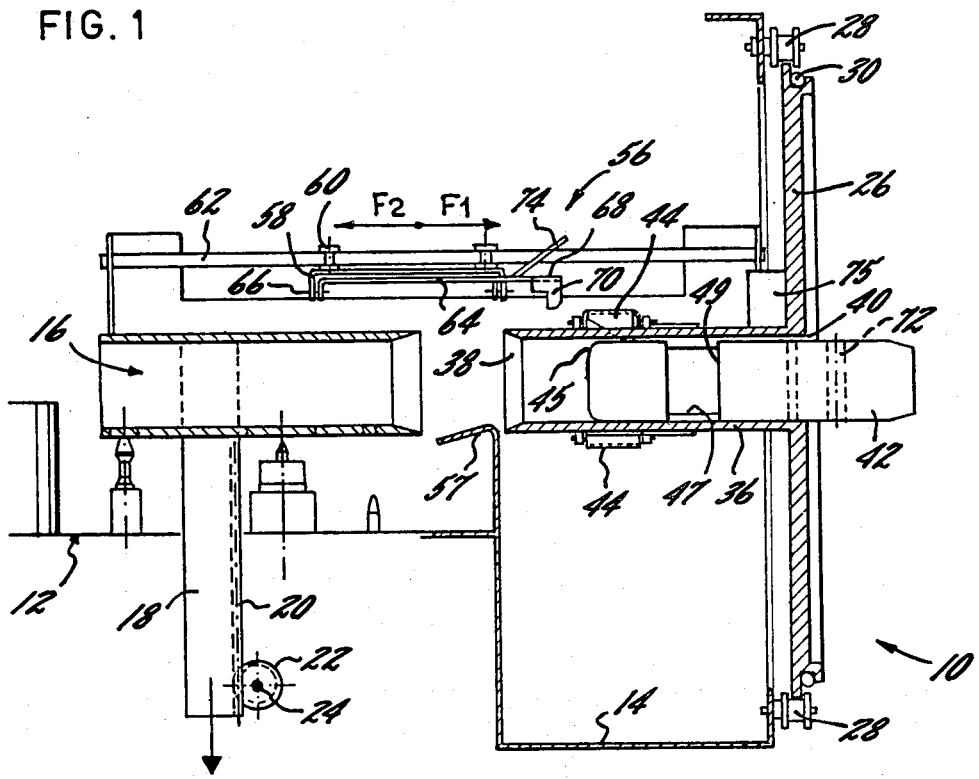
FIG. 1 is a lateral section view taken substantially in the plane of lines 1—1 in FIG. 3 and including additional detail of the tape machine.

Referring to FIG. 1, there is shown an automatic cassette inverting apparatus 10 attached to video tape machine 12 by means of a frame 14. The video tape machine 12 includes a housing 16 into which a video tape cassette may be inserted from right to left in FIG. 1. Once the video tape cassette is positioned in housing 16, the housing is lowered by means of an elevator 18 comprising a rack 20 and pinion 22 driven by motor 24. After the tape in the cassette within housing 16 has finished playing, the elevator 18 is again automatically activated to raise the housing 16 to the position shown in FIG. 1.

The automatic cassette inverting machine 10 includes a disc 26 mounted on frame 14 by means of rollers 28. The disc 26 is rotated by means of a belt 30 (FIG. 3) which is driven by a pulley 34 on motor 32. A rectangular magazine 36 extends horizontally from and is an integral part of the disc 26. The magazine 36 is open at each end 38 and 40, respectively, and is dimensioned to receive a cassette 42 through either opening.

With the cassette 42 held at a holding position in the magazine 36, the motor 32 rotates the disc and magazine 180 degrees to invert the cassette. In order to insure a precise rotation of 180 degrees, a catch mechanism 59 (FIG. 3A) is provided. The catch mechanism includes a lever 59 attached to a pivot 61. The lever 59 is biased for clockwise rotation about the pivot by spring 63 and can be rotated counterclockwise by solenoid 65. The lever 59 has a notch 67 at the end opposite the spring and solenoid and a cam surface 69 along its top edge. When the disc and magazine are rotated 180 degrees, the notch catches and holds one of two posts 71 located precisely 180 degrees apart on the perimeter of disc 26. In order to rotate the disc the solenoid is activated to release the post and then deactivated. The next post then rotates into contact with surface 69 as the disc rotates clockwise (FIG. 3A) to reset the spring tension so that the notch will grab and hold the next post 71.

Figure 2:
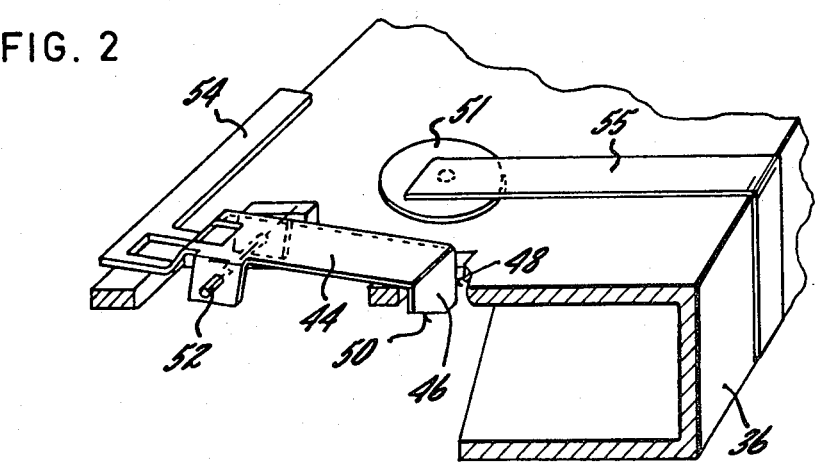
FIG. 2 is a detailed view partially in section of the magazine.

Identical stop mechanisms 44 are mounted on top and bottom of the magazine and serve to stop the leftward movement in FIG. 1 of the cassette 42 beyond the predetermined holding position so that during insertion of the cassette and rotation of disc 26, the cassette will not move and interfere with the housing 16 of the tape machine. The stop mechanism 44 is a pawl which has on one end a cassette engaging tab 46 (FIG. 2) having a vertical edge 48 and an inclined camming edge 50. The pawl is pivoted on pivot 52 and has a control arm 54 extending oppositely from the cassette engaging tab 46. The pawl 44 is free to pivot about the pivot 52 in response to the effects of gravity with the tab end being the longer and heavier arm of the pawl 44. As a result, the tab 46 of the top pawl will pivot and extend into the magazine 46 and into the path of the cassette 42 as it is inserted by the user from right to left in FIG. 1.

As the cassette 42 is inserted, its leading edge has a rounded edge 45 which engages the vertical edge 48 of the pawl 44 so as to lift the tab 46 out of the way. As the cassette continues moving from right to left, the tab 46 drops into the slot 47 of the cassette. As the cassette continues its leftward movement, the vertical edge 48 of the pawl tab 46 engages the vertical edge 49 of the slot 47 thus stopping further insertion of the cassette.

Referring to FIG. 7, the magazine 36 also has mounted on its top and bottom two identical arrest mechanisms or detents 51 each of which extend through an opening 53 in the magazine to engage and arrest any inertial travel of the cassette as it is being fed from the tape machine housing 16 to the holding position in the magazine 36. Each detente 51 is biased to extend into the magazine by a spring 55. Each opening 53 is located to correspond to the reel opening in the cassette.

Referring to FIG. 1 again, a back up stop mechanism 57 is also provided as a safety to insure the cassette cannot move leftward and interfere with the tape machine housing 16 as the disc 26 rotates and turns over the cassette. The back up stop mechanism 57, which comprises a vertically extending plate disposed in a plane perpendicular to the direction of travel of the cassette between the magazine and tape machine, is required because the stop mechanisms 44 may both be disengaged by centrifugal force overcoming gravitational force at the point of disc rotation (90 degrees) where the cassette is vertical.

Figure 3:
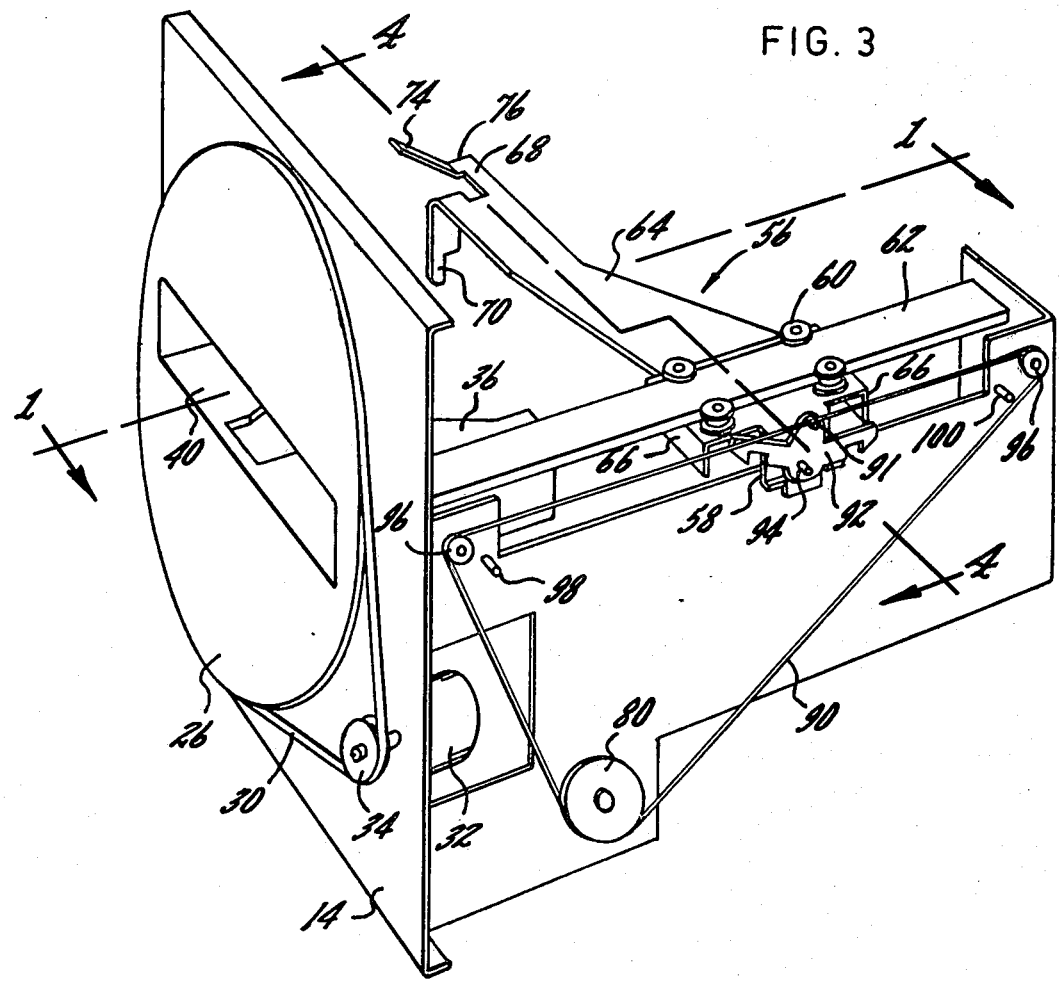
FIG. 3 is a perspective view showing the automatic cassette inverting apparatus.
Figure 3A:
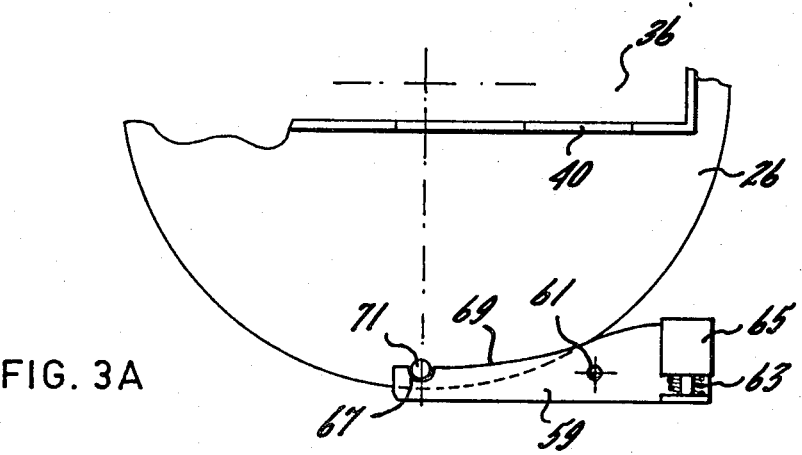
FIG. 3a is a detailed view of a portion of the magazine to show a positive catch mechanism on the magazine.

In order to move the cassette between the tape housing 16 and the magazine's holding position there is shown in FIGS. 1 and 3 a transfer mechanism 56 which includes a carriage 58 mounted by means of rollers 60 on a bar 62 to allow travel of the carriage 58 along the length of the bar 62. A transfer arm 64 is pivotally mounted by means of pivots 66 to the carriage 58 so that the outer end 68 of the transfer arm 64 can move up and down.

The outer end 68 of the transfer arm 64 includes a downward projection 70 which during operation of the transfer mechanism engages a slot 72 in the cassette (FIG. 1 and FIG. 9) to convey the cassette between the holding position in the magazine 36 and the housing 16 of the tape machine 12. The outer end of the transfer arm 64 also includes a camming tab 74 which operates to raise the outer end of the transfer arm when the tab 74 engages a block 75 (FIG. 8) that protrudes from the disc 26. The outer end of the transfer arm also includes a flat tab portion 76 which cooperates with arm 54 of the stop mechanism 44 (FIG. 8a and FIG. 9a) to disengage the pawl 44 so that the cassette can be conveyed from the magazine into the tape machine housing 16.

Figure 4:
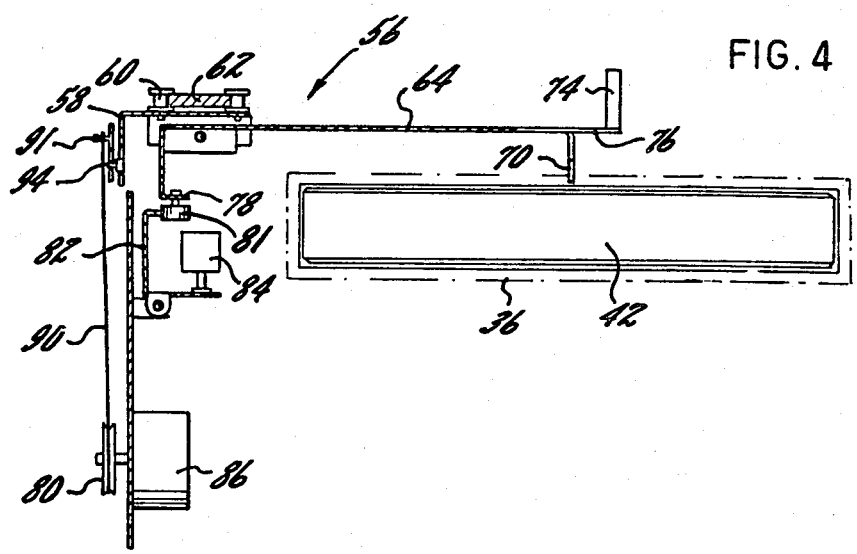
FIG. 4 is a sectional view taken along the plane of line 4—4 in FIG. 3.
Figure 5:
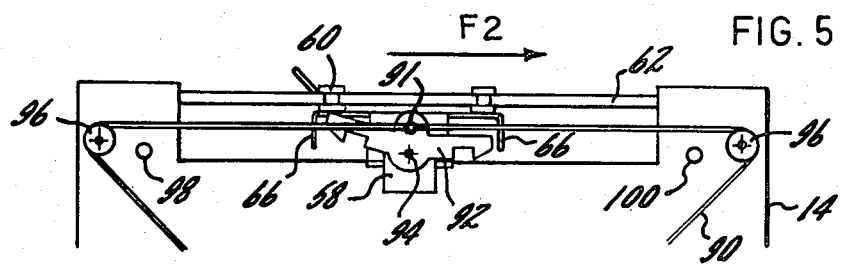
FIGS. 5 and 6 are side elevation views showing the transfer mechanism of the automatic cassette inverting apparatus.

Referring to FIG. 4, the transfer arm 64, also has an inner end 78 which is connected by means of a roller 81 to a rocker 82 and thus to a solenoid 84. The solenoid 84, by means of the rocker arm and roller connection to the inner end 78 of the transfer arm 64, operates to raise the transfer arm so that the transfer arm can be moved from the magazine toward the tape machine without conveying the cassette with it and thus not interfere with the rotation of the disc and magazine.

Referring to FIGS. 3 and 4, the carriage 58 is driven back and forth along rail 62 by means of cable 90 attached to a peg 91 on a double pawl mechanism 92 which pawl mechanism is pivotally mounted on the carriage by means of pivot 94. The cable 90 is looped about rollers 96 and drive pulley 80 which drive pulley is rotated by reversible motor 86 (FIG. 4). The peg 91 is offset from the pivot 94 so that force applied to the peg 91 causes the double pawl 92 to pivot. The double pawl engages and locks onto posts 98 and 100 at the magazine end and tape machine end respectively of the carriage's travel. The pawl 92 is released by the pivoting of the pawl produced by the cable 90 on the peg 91.

There are also limit switches 102, 104 and 106 (FIG. 6) which are closed by contacting carriage 58 and thus detect the carriage position.

Having thus described the construction of the automatic cassette inverting apparatus, the operation will next be described.

Referring to FIG. 1, a cassette 42 is initially inserted by the user into the magazine 36 through the right hand opening 40. As the cassette 42 is inserted into the magazine, right to left, leading edge of the cassette with its rounded corner 45 engages tab 46 (FIG. 2) of pawl 44 and moves the tab 46 out of the way of the cassette. As the cassette continues from right to left into the magazine in FIG. 1, the tab 46 drops into the slot 47 in the cassette and then engages a vertical edge 49 of slot 47 to stop the further leftward movement of the cassette.

Figure 6:
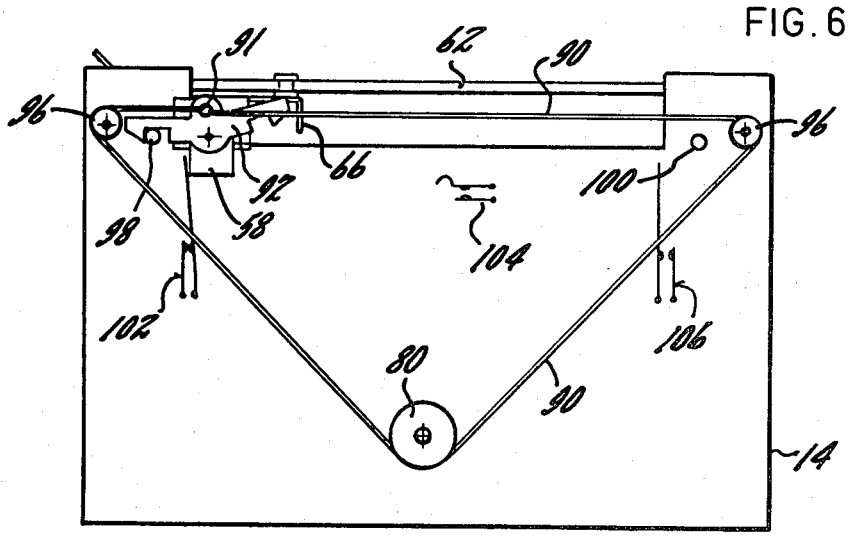

The transfer mechanism 56 is initially in a position adjacent the magazine as shown in FIGS. 6 and 8 with the pawl 92 hooked on post 98 to insure that the transfer mechanism is not inadvertently moved from the position shown in FIGS. 6 and 8. With reference to FIG. 8, it can be seen that the tab 74 at the outer end of the transfer arm 64 has engaged a block 75 attached to the disc 26. As a result, the outer end 68 of the transfer arm 64 has been raised to the position shown in FIG. 8 so that the cassette engaging tab 70 is lifted out of the magazine so that the engaging tab 70 does not interfere with insertion of the cassette into the magazine.

In order to effect the transfer of the cassette 42 from its holding position in the magazine shown in FIG. 8, into the tape machine housing 16, the transfer motor 86 is activated to drive pulley 80 clockwise (FIG. 3) which causes the cable 90 to first unhook the pawl 92 from the post 98 and then to move the carriage 58 along bar 62 toward the tape machine housing 16.

Referring to FIGS. 9 and 9A, there is shown the cooperation between the transfer arm 64, the stop pawl 44, the cassette engaging tab 70 and the aperture 72 in the cassette. As the transfer mechanism moves toward the tape machine, the tab 74 disengages the block 75 thereby lowering the tab 70 into the aperture 72 of the cassette to provide a means for conveying the cassette along with the movement of the transfer mechanism. At the same time, the flat tab 76 (FIG. 9a) engages the control arm 54 of the pawl 44 to raise the tab 46 out of the path of the cassette to allow the casette to move in the direction toward the tape machine housing 16.

When the transfer carriage 58 has reached the position adjacent the tape machine switch 106 is closed to stop motor 86, and the pawl 92 on the transfer carriage 58 hooks post 100 to assure that the transfer mechanism remains at that position. With the transfer mechanism in the position adjacent the tape machine and with the cassette in the housing 16, the elevator 18 is activated to lower the cassette onto the drive spindles of the tape machine.

After the tape has finished playing, the elevator is again reactivated to raise the cassette in housing 16 back to the elevated position shown in FIG. 1. Because the transfer mechanism 56 was locked in position by means of post 100 and pawl 92, the opening 72 in the cassette 42 re-engages the cassette engaging tab 70 of the transfer mechanism 56.

With the tab 70 engaged in opening 72 of the cassette, the transfer mechanism motor 86 is again operated to drive the pulley 80 counterclockwise (FIG. 3) first to unlatch the pawl 92 from the post 100 and then to drive the carriage 58 toward the magazine 36 carrying the cassette 42 along.

As the carriage 58 approaches the magazine and disc, the slanted tab 74 at the end of the transfer arm 64 engages block 75 so as to release the engaging tab 70 from the aperture 72 of the cassette as the cassette approaches its holding position. After the tab 70 has disengaged from the aperture 72, the arrest mechanism 51 arrests any further inertial movement of the cassette so that it is in a proper holding position for inversion and subsequent retransfer to the tape machine housing 16. Also, the cassette thus arrested by the arrest mechanism 51 is in a position so that the tab 46 of pawl 44 again engages the vertical edge 49 of the slots 47 to assure that the cassette cannot be pushed back into the area of the tape machine housing.

As soon as the tab 70 of the transfer arm 64 has disengaged the cassette, the solenoid 84 (FIG. 4) is activated to insure that the outer end of the transfer arm 64 remains raised. With the solenoid thus engaged, the transfer motor 86 is again activated to drive the pulley 80 in the clockwise direction (FIG. 3) so as to cause the transfer carriage 58 to move back toward the tape machine. Because the solenoid 84 was activated, the tab 70 is not lowered into the aperture 72 as the slanted tab 74 disengages the block 75. Therefore, the cassette is not moved as the transfer mechanism is driven toward the tape machine housing 16. The reason for moving the transfer mechanism away from the magazine and disc toward the tape machine housing is to have the transfer out of the way of the disc and magazine during the rotation of the disc and magazine. Once the carriage 58 of the transfer mechanism 56 has reached the position of switch 104 (FIG. 6), the transfer mechanism stops and the cassette inverting apparatus is ready to invert the cassette.

The cassette is inverted by activating solenoid 65 which releases catch mechanism 59 from a post 71 on the disc 26 and by simultaneously activating inverting motor 32 which drives pulley 34 and belt 30 to turn disc 26 with the attached magazine 36.

As the disc reaches 90 degrees of rotation, the pawls 44 may have a tendency to disengage the vertical edge 49 of the cassette, thereby making it possible for the cassette to be pushed toward the tape machine housing 16 and thus interfere with the rotation of the disc 26. In order to assure that that does not happen, the backup stop mechanism 57 is provided so that if the cassette is pushed toward the tape machine housing, the end 45 of the cassette will abut against the backup stop mechanism 57 until the rotation passes 90 degrees and the pawl 44 on top, under the influence of gravity, takes over the function of stopping further movement of the cassette toward the tape machine.

Once the disc 26 has been rotated 180 degrees, the latch 59 engages the next post 71 on the disc to insure the proper alignment of the magazine, and the transfer mechanism is then driven back toward the magazine so that the tab 70 of the transfer arm 64 can again engage the aperture 72 on the cassette to convey it to the housing 16 of the tape machine for playing of the other side of the tape. When the cassette has been conveyed back to the housing 16 of the tape machine, the arm 64 remains pivoted downward to hold the cassette in position in the housing 16 until the cassette is locked into the housing by the pins and drive elements (not shown) of the tape machine 12.

I claim as my invention:

1. Apparatus for inverting a cassette for use in connection with a recorder/playback device, the inverting apparatus comprising:
   (a) a rotatable magazine for receiving the cassette and inverting the cassette during rotation of the magazine;
   (b) movable stop means for stopping and retaining the cassette at a holding position within the magazine; and
   (c) transfer means separate from said rotatable magazine for removing the cassette from said holding position in the rotatable magazine and conveying the cassette to an operating position in the recorder/playback device, said transfer means engaging and moving said stop means to release the cassette.

2. The apparatus of claim 1, wherein, the stop means includes a pawl having a cassette engaging tab and a control arm and the transfer means includes means for contacting the control arm of the pawl so that the cassette engaging tab of the pawl is disengaged from the cassette during conveyance of the cassette between the holding position and the operating position.

3. The apparatus of claim 2, wherein the stop means further includes back up stop means disposed in a plane extending perpendicular to the direction of travel of the cassette between the magazine's holding position and the recorder/playback device's operating position.

4. The apparatus of claim 2, wherein the stop means further includes an arrest means comprising detente means for engaging the cassette and arresting its inertial movement as the cassette is conveyed from the operating position of the recorder/playback device to the magazine's holding position.

5. The apparatuc of claim 1, wherein the magazine is disposed to hold the cassette horizontally.

6. The apparatus of claim 1, wherein the transfer means includes a carriage, which carriage is movable between the holding position and the operating position and a transfer arm pivotally mounted on the carriage to engage and disengage the cassette to convey the cassette between the operating position and the holding position.

7. The apparatus of claim 6, wherein the transfer arm includes tab means for cooperating with a block on the magazine to disengage the transfer arm from the cassette.

8. The apparatus of claim 6, wherein the carriage includes locking means for holding the carriage at the holding position and the operating position.

9. The apparatus of claim 6, wherein the transfer means includes activator means for pivoting the transfer arm out of engagement with the cassette to allow the carriage to withdraw from the holding position during inverting of the cassette.

10. The apparatus of claim 1, wherein the rotatable magazine includes locking means for accurately stopping and holding the magazine at a predetermined rotational position.

* * * * *

UNITED STATES PATENT AND TRADEMARK OFFICE
CERTIFICATE OF CORRECTION

PATENT NO. : 4,394,698

DATED : July 19, 1983

INVENTOR(S) : Etienne A.M. Schatteman

It is certified that error appears in the above-identified patent and that said Letters Patent is hereby corrected as shown below:

On the title page, below [22], should be inserted,

[30] Foreign Application Priority Data

March 31, 1980 [BE] Belgium ....................200.042

Signed and Sealed this

First Day of November 1983

[SEAL]

Attest:

GERALD J. MOSSINGHOFF

Attesting Officer    Commissioner of Patents and Trademarks